W. H. COLDWELL.
MOTOR LAWN MOWER.
APPLICATION FILED OCT. 15, 1917.

1,263,209.

Patented Apr. 16, 1918.
6 SHEETS—SHEET 1.

Fig. 1.

INVENTOR
William H. Coldwell
BY
ATTORNEYS.

UNITED STATES PATENT OFFICE.

WILLIAM H. COLDWELL, OF NEWBURGH, NEW YORK.

MOTOR LAWN-MOWER.

1,263,209.    Specification of Letters Patent.    Patented Apr. 16, 1918.

Application filed October 15, 1917. Serial No. 196,654.

*To all whom it may concern:*

Be it known that I, WILLIAM H. COLDWELL, a citizen of the United States, residing at Newburgh, in the county of Orange and State of New York, have invented certain new and useful Improvements in Motor Lawn-Mowers; and I do hereby declare the following to be a full, clear, and exact description of the invention, such as will enable others skilled in the art to which it appertains to make and use the same.

My invention consists in the novel features hereinafter described, reference being had to the accompanying drawings which illustrate one embodiment of the invention selected by me for the purposes of illustration, and the said invention is fully disclosed in the following description and claims.

My invention relates to motor propelled lawn mowers of the kind in which a wide swath is cut by a plurality of mower units, each of which cuts a portion of the width of the entire swath cut by the machine, each mower unit being provided with its own rotary ground engaging traction devices for operating its own cutting mechanism, the traction devices of all of said units having their axes substantially in a single vertical plane extending transversely of the mower, while the cutting devices of the said several units overlap each other in such a manner as to cut a wide swath continuous from one side of the mower to the other, the said mower units being combined with a tractor comprising a tractor frame supported on traction wheels and driven by a suitable motor.

In my former patent of the United States No. 1,246,234, dated Nov. 13th, 1917, I have disclosed a gang lawn mower comprising a plurality of mower units, organized in the manner above described, and capable of being propelled over the ground either by a horse or other draft animal or animals, or otherwise.

My present invention consists in the coordination and combination with a plurality of mower units, organized in the manner set forth in my said former application, of a tractor detachably secured thereto, and constructed and operating in such manner that the various advantageous results herein described are secured when the device is operated by the tractor, while at the same time the tractor may be separated from the gang mower proper to permit the latter to be drawn by a draft animal, and also to permit the tractor to be used for other purposes.

One peculiarity of the gang lawn mower proper organized as above set forth is that it can be steered by turning the entire machine upon a center located at one point between the two outermost ground engaging traction devices of the individual mower units in the same manner as an ordinary two-wheeled vehicle, as the traction devices of all the units are in line. According to my invention, I connect the tractor to the gang mower proper by means preferably in the form of an elongated horizontal pivotal connection, which permits the entire gang mower structure to rock transversely with respect to the frame and traction wheels of the tractor, while at the same time supporting the horizontally disposed frame of the gang mower to which the individual units are connected in horizontal position over the axes of the traction wheels of the several mower units, and also providing for the turning of the entire gang mower proper with respect to the tractor member upon a vertical axis which preferably coincides with the vertical plane of the axes of the mower units and passes through the axis of the longitudinal pivotal connection before referred to.

My invention also contemplates means for simultaneously elevating all the cutting mechanisms of the several mower units out of operative relation with the ground and of lowering them into operative relation with the ground from the tractor frame, controlling means being provided within convenient reach of the driver's seat, and also contemplates other advantageous features of construction, and combination of parts hereinafter fully set forth, among which may be mentioned the provision of means for adjusting the traction wheels of the tractor member longitudinally with respect to the tractor frame for the purpose of shifting the weight carried thereby forward or back of the axis of said traction wheels, more or less, and thereby directly varying the weight carried by the traction wheels of the mower units, and the location of the radiator for the motor at the rear end of the tractor at the point farthest removed from the cutting mechanisms in order that the cut grass may not be drawn into the openings of the radiator by the ventilating fan of the engine, as would be the case if the radiator were located at the front of the tractor member.

Referring to the accompanying drawings, which illustrate one embodiment of the invention selected by me for purposes of illustration:

Fig. 5 is a vertical transverse section through one form of fifth wheel structure and longitudinal pivotal connections which connect the tractor frame and the propelled frame or mower frame of the machine.

Fig. 6 is a longitudinal vertical sectional view of the parts shown in Fig. 5.

Fig. 7 is a detail view illustrating one arrangement of parts for connecting the axle of the tractor wheels to the tractor frame, so that the said wheels can be adjusted longitudinally with respect to the tractor frame to vary the amount of weight carried by the propelled frame.

The gang mower proper herein shown is constructed substantially as shown in my former patent above referred to, and comprises the following members: The main frame of the gang mower, as shown, consists of a pair of transverse bars, 1—1, connected adjacent to their outer ends by longitudinal bars, 2, to which are pivotally connected the laterally disposed mower units, which are alike in structure. Each of these units comprises side frames indicated at 3 carrying drive wheels, 5, mounted on axles, 4, and connected by gearing with the rotary cutter indicated at 6, which operates in conjunction with the usual stationary knife, 10, the rear ends of the side frames being carried by the usual rear roller 11, adjustably secured to the frames for the purpose of regulating the height of cut. Each of the lateral mower units is provided with a transversely disposed supporting member, 20, which is pivotally connected with the side frames in any desired manner, and is provided with means, as a saddle having a sleeve portion, 24, for pivotally engaging the bar, 2, of the main frame, said bar being conveniently in the form of a pipe or tube, thus forming a pivotal connection between the frame and each of the lateral mower units. Between the inner traction wheels, 5, of the lateral units, I provide the rotary ground engaging traction device or devices for the third or centrally located mower unit, which may be traction wheels, as shown at 30, (or a light roller) which are preferably of smaller diameter than the traction wheels, 5, of the lateral mower units, but have their axes in the same vertical plane, extending transversely of the machine, as the axes of the wheels, 5, so that the ground engaging portions of all of the traction devices of all three units are substantially in a single line extending transversely of the machine. This central traction roller does not support any portion of the frame of the gang mower, but merely supports the rear end of the frames of the centrally disposed mower unit, the front end of which is carried, in this instance, by caster wheels, indicated at 34. The frame of the centrally located mower unit is provided with forwardly extending side plates, 31, the rear ends of which are provided with bearings for the shaft of the traction roller, 30, the forward ends being connected, in this instance, to a transversely disposed plate, 32, from which the side frames, 33, extend forwardly and carry the rotary cutter, 36, and its co-acting stationary knife.

The caster wheels, 34, are adjustable vertically to vary the height of cut of the central mower unit in a well known way. The central mower unit is propelled over the ground by push arms indicated at 40, having their rear ends pivotally connected to the main frame of the gang mower, as at 42, and having their forward ends loosely connected to the centrally located mower unit, and preferably to hubs surrounding the bearings for the shaft of the traction wheels or roller, 30, this loose connection being conveniently made by enlarging the holes in the forward ends of the push arms, and making the outer faces of the side plates or the inner faces of the push arm convex, for example, this loose connection being such as to permit the central mower unit to rock freely transversely with respect to the gang mower frame, and the other mower units so that the caster wheels, 34, which are closely associated with the cutting mechanism of the central unit may be at all times in contact with and follow the configuration of the ground traversed, and cause the cutting mechanism to follow the configuration of the ground.

Suitable driving means are provided for driving the rotary cutter of the central unit from its traction wheels, in this instance, sprocket wheels and sprocket chains, the details of which form no part of my present invention, and need not be particularly described. In order to assist in holding the front central cutter unit at all times in longitudinal alinement with its traction wheels, I prefer to provide the gang mower frame with downwardly depending guide rods, 90, which loosely engage the lateral frame bars of the central unit, and assist in holding it in such position and in swinging it to the right and left on its caster wheels when the device is turned. The specific details of the gang lawn mower hereinbefore described are covered by my former application above referred to, and are not herein specifically claimed. It will be understood that the gang mower thus far described is capable of being propelled over the ground, in any desired manner, provided that the gang mower frame is maintained in a horizontal position over the axes of the traction devices of the several mower units. It will also be understood that each mower unit is entirely free to rock transversely independently of all the other units, in passing over uneven ground, to accommodate the cutting mechanism to the surface traversed, and that the cutting mechanisms of each unit can rise and fall independently of the others for the same purpose.

As the traction devices of all of the mower units are in a single line extending transversely across the machine, the machine can be readily turned to the right or the left and will act in the same manner as a two-wheeled vehicle, that is to say, it will be turned upon an axis somewhere between the two outermost traction wheels. In such turning movement part of the traction devices may rotate forwardly and part rearwardly if the turn is made very short, and as will be seen, the machine possesses the greatest possible facility for turning. When the device is drawn by a draft animal, a suitable shaft or tongue will be rigidly attached thereto in order to hold the gang mower frame, 1, in horizontal position, and I have shown in the drawings brackets indicated at 70ª—70ª, or as, in this instance, secured to longitudinally extending bars, 70ᵇ, carried thereby, to which such draft appliances can be rigidly secured. For the purpose of connecting a tractor member to the gang mower, I prefer to provide the gang mower frame with a demountable fifth wheel and pivot structure, shown in the drawings. To this end the gang mower frame is provided with a pair of longitudinally extending bars adjacent to the center thereof indicated at 1ª, and which preferably extend forward of the other portions of the frame. On these bars I secure the lower segments, 100, of the fifth wheel structure, and between said bars I support a block or casting, 101, (see Figs. 5 and 6) rigidly secured thereto, and provided with an upwardly extending reduced sleeve, 102, the block being provided with a central circular aperture, 103. The upper portion of the sleeve, 102, is exteriorly threaded to receive a retaining circular nut, 104. The upper portion of the fifth wheel structure comprises a pair of longitudinally extending supports preferably in the form of channel bars indicated at 105, and carrying on their front and rear ends the upper segments, 106, of the fifth wheel structure, which rest upon the segments, 100. These channel bars 105, also carry, rigidly secured thereto, a block or casting, 107, having a central circular opening adapted to fit over the sleeve, 102, which sleeve extends above the block, 107, so that when the nut, 104, is screwed on the sleeve, a pivotal connection is established between the upper fifth wheel member and the lower fifth wheel member, having a vertical axis. The upper fifth wheel member is also provided with a pair of horizontally disposed bearings, one forward and one in rear of the axis of the vertical pivotal connection. In this instance, I have shown the channel bars, 105, provided with a pair of bearing brackets, 108, securely bolted thereto, and provided with horizontally alined bearings to receive a horizontal shaft or pipe, 109, extending forwardly from the tractor member, as hereinafter described, and forming what might be termed the "reach" connecting the tractor member and the gang mower member. This shaft or pipe, 109, is provided with collars, 110, on opposite sides of one or both of the bearings, 108, so as to prevent longitudinal movement of the shaft therethrough, and it will be seen that this shaft can turn on its longitudinal axis with respect to the gang mower frame and vice-versa, and that the bearings engaging the shaft will hold the gang mower frame horizontal. I prefer to have the axis of the vertical pivotal connection between the fifth wheel members substantially in the vertical plane in which the axes of the traction devices of the mower units are located, and I also prefer to have the bearings, 108, located at equal distances on opposite sides of said axes, and I also prefer to have the vertical axis referred to pass through the horizontal axis of the shaft, 109, as this construction gives an accurate balance to the entire motor lawn mower.

It will also be seen that by removing the nut, 104, the parts of the fifth wheel structure can be separated thereby enabling the mower to be used with a draft animal or otherwise independently of the tractor member, and also permitting the tractor member to be used independently of the mower member as hereinafter more fully set forth.

The tractor member comprises a horizontal frame, 130, which may be of any usual or preferred form of construction supported adjacent to its rear end by a pair of traction wheels, 121, mounted to rotate loosely upon the ends of an axle, 122, extending across the machine, and secured to the tractor frame. The tractor frame carries a suitable motor, preferably a gasolene explosion engine, indicated in dotted lines at 123, provided with the usual cooling radiator, 124, located at the extreme rear of the machine, and having its air inlets on the rear face and the usual fan indicated in dotted lines at 125 located between the radiator and the engine cylinders, the weight of these parts and of the gasolene tank, indicated at 126, being located on that portion of the frame substantially over the axle, 122.

I prefer to house in the engine, as indicated, and to provide a driver's seat, 127, which may conveniently be supported on the housing.

Combined with the motor or engine, and in fixed operative relation thereto is a counter shaft indicated at 128, connected to the engine by the usual differential gearing indicated at 129, and by a change gear transmission of usual or well known construction (not shown), 130, indicating the lever for changing the gears to vary the speed and direction of the drive. I prefer to drive each of the traction wheels separately from the counter shaft, 128, by means of sprocket wheels and chains, 131, as shown. I also prefer to so connect the wheel axle, 122, to the tractor frame that it may be adjusted forward or backward with respect to the frame so that more or less of the load carried by the traction wheel can be thrown forward upon the mower which forms the front steering truck of the entire apparatus. This may be accomplished in many ways. For example, I have shown in Fig. 7 the axle, 122, the central portion of which is preferably substantially rectangular, connected by inverted U-bolts, 132, and a saddle, 133, to the side bars of the frame, 120, adjusting screws, 134, being provided forward and in rear of the axle to assist in holding the axle exactly in its adjusted position. By slacking off the U-bolts, 132, and one of the retaining bolts or screws, 134, the axle can be adjusted forwardly or rearwardly as desired, and I contemplate a sufficient range of adjustment so that a greater or less proportion of the weight of the tractor frame and its load can be thrown upon the gang mower frame, or the weight of the tractor frame and its load can be entirely removed from the mower frame, and the center of gravity carried to the rear of the axis of the tractor wheels so as to actually cause the front portion of the tractor to exert a lifting effect on the gang mower frame, if this should be desirable, as in traversing very soggy ground, in which case the broad wheels of the tractor will not cut into the ground under a load to any such extent as would the narrow traction wheels of the gang mower. The front end of the traction frame is provided centrally with the forwardly and longitudinally extending pivotal shaft or tube, 109, hereinbefore referred to, which is rigidly secured to the traction frame in any desired manner as by U-bolts and saddle.

I prefer to make the shaft, 109, of considerable size and to make it tubular for lightness. The traction frame is provided with a steering wheel, indicated at 135, which is suitably connected to the gang mower frame, or other part secured to the lower fifth wheel member, in any desired way. In the present instance, I have shown chains, 136, each provided with a spring take-up, 137, extending from the rear bracket, 70$^a$, on the gang mower frame rearwardly to a suitable winding drum (not shown) operatively connected with the steering wheel, 135, in a well known way, so that as one chain, 136, is wound up the other will be unwound, and the entire gang mower frame and the mower units connected therewith will be swung upon the vertical axis of the fifth wheel structure.

I also prefer to provide means for simultaneously raising all of the cutting mechanism of the several mower units out of operative relation with the ground, and for simultaneously lowering them into operative relation.

In the present instance, I have shown a chain, 137$^a$, or other flexible connection extending forwardly from a suitable winding mechanism (not shown) which is conveniently located in the boot of the tractor member, and is provided with a winding device as a crank, 138, operating a suitable winding drum through a slow worm and worm wheel so as to hold itself in adjusted position. The chain, 137$^a$, extends, in this instance, over a pulley, 138$^a$, supported on a bracket secured to the tubular pivot or rod, 109, and thence downward through or around the said pivot tube or rod, and down through the central aperture in the sleeve, 102, and block, 101, where it divides into two flexible members, 139, 140. The strand, 139, extends over a pulley, 141, thence horizontally to the front of the mower frame where it passes over a second pulley, 142, and thence down to the front mower unit. The other strand, 140, extends over a pulley, 143, and thence rearwardly, dividing into two branches, 140$^a$, and 140$^b$, which pass around horizontally disposed pulleys, 144, and thence laterally in opposite directions, and over pulleys, 145, at the opposite ends of the rear frame bar, 1, of the gang mower frame from which they extend downward to bails secured to the side frames of the lateral lawn mower units. I prefer to provide the chains or connections, as best seen in Fig. 6, with take-up springs (200), each connected to its portion of the chain at two points, separated a greater distance than the normal length of the spring when the chain is not under tension. These springs automatically and yieldingly take up the slack in the chains when the mower units are in operative relation with the ground and prevent the chains from slapping and jumping off of their pulleys.

Obviously by winding up or drawing chain, 137ª, all three of the chains, 140ª, 140ᵇ, and 139, will be drawn, and will serve to simultaneously elevate the cutting mechanisms of all three mower units, and in like manner by unwinding or loosening chain, 137ª, the cutting mechanisms may be lowered until the caster wheels, 134, of the front central unit, and the rear rollers, 11, of the lateral units are in contact with the ground. During the operation of the mower these chains are allowed to remain slack so as not to interfere with the rise and fall of the cutting mechanisms in passing over the ground.

It will be seen that the tractor wheels and the tractor frame can twist on the axis of the pivotal rod or tube, 109, or rock transversely with respect to the gang lawn mower frame, and that the tractor wheels and the rear end of the tractor frame can rise and fall with respect to the mower units, and it will also be understood that each mower unit is free to rock transversely with respect to not only the gang mower frame, but also the tractor frame, and that the individual cutting mechanisms of the several mower units can rise and fall independently of their own traction devices. This construction secures a very flexible machine in which torsional strains are practically eliminated and in which the cutting mechanism throughout the entire width of cut conforms as perfectly as possible to the surface of the ground without being influenced either by the frame of the gang mower member or the tractor frame.

I have stated that the radiator for the motor shown at 124 is located at the extreme rear of the tractor frame and has its air inlet apertures in its rear face. This is desirable as the location of it in a more forward position tends to cause the fan to draw into the radiator fine particles of grass which clog it up and prevent it from operating practically and may cause injury to the engine by overheating. To further protect the radiator, I prefer to provide in rear of the gang mower member a depending screen or flap to prevent the flying particles of grass from passing rearwardly where they might be drawn into the radiator by the fan as the machine rapidly passes over the ground. In this instance, I have shown a transverse bar, 150, secured to the forward end of the tractor frame, for example, and provided with a depending flap, 151, of cloth, leather or other suitable material, and being of substantially the full width of the gang mower member, so as to cause any foreign particles thrown to the rear by the revolving cutters to be deposited on the ground before being reached by the rear end of the tractor member, thus preventing such particles from being drawn into the radiator.

As before stated, the tractor member may be readily separated from the gang mower member without disconnecting it from the upper fifth wheel member by simply removing the nut, 104, (Fig. 6). Obviously it can also be disconnected by removing the collars, 110, from the longitudinal bar, 109, but I prefer to separate the two members by separating the parts of the fifth wheel structure.

Figure 1:
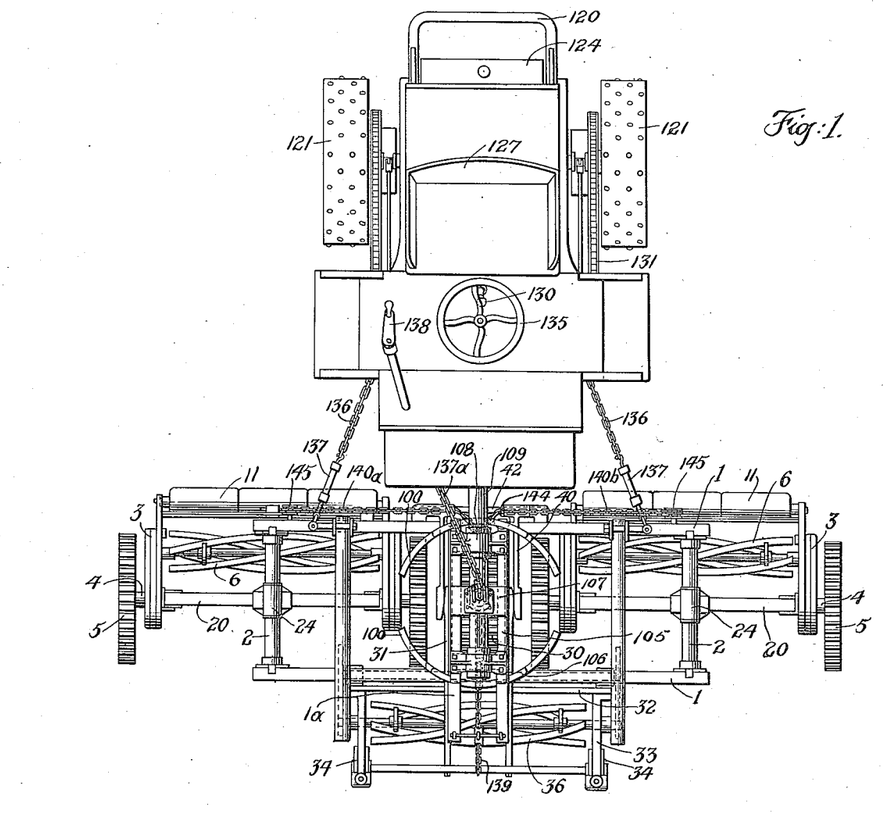
Figure 1 represents a top plan view of a motor lawn mower constructed according to and embodying my invention.
Figure 2:
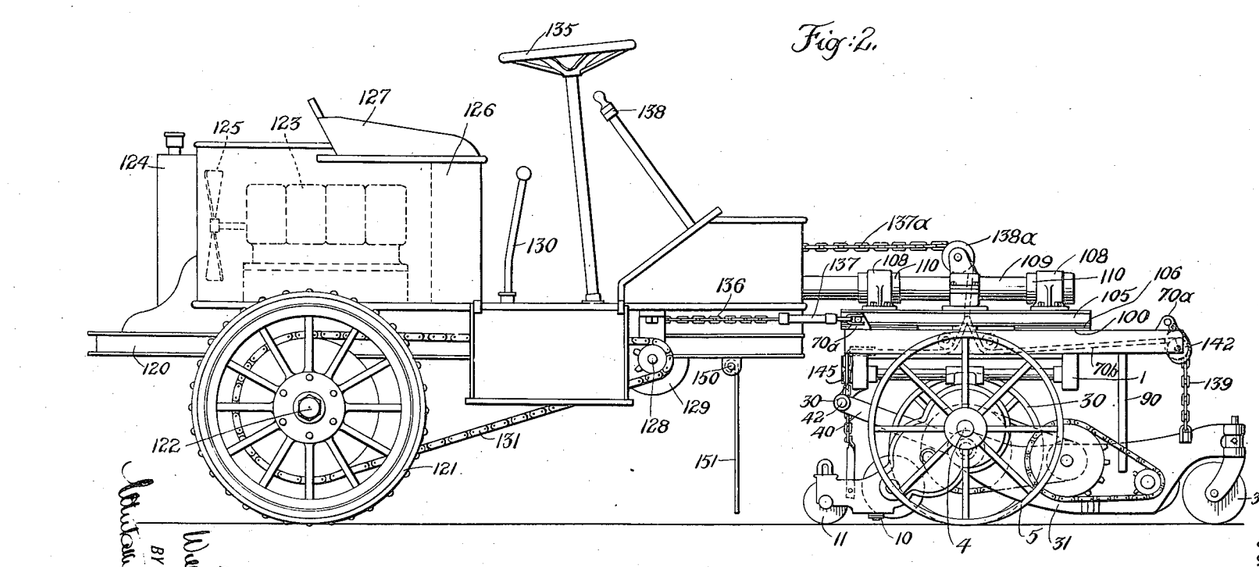
Fig. 2 represents a side elevation of the same.
Figure 3:
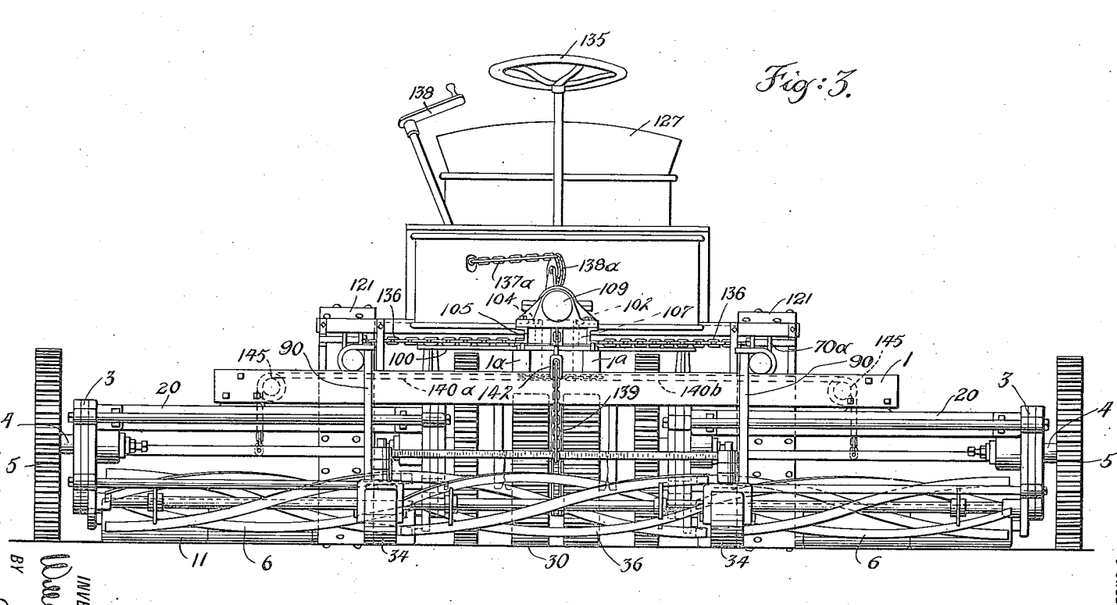
Fig. 3 represents a front elevation of the machine.
Figure 4:
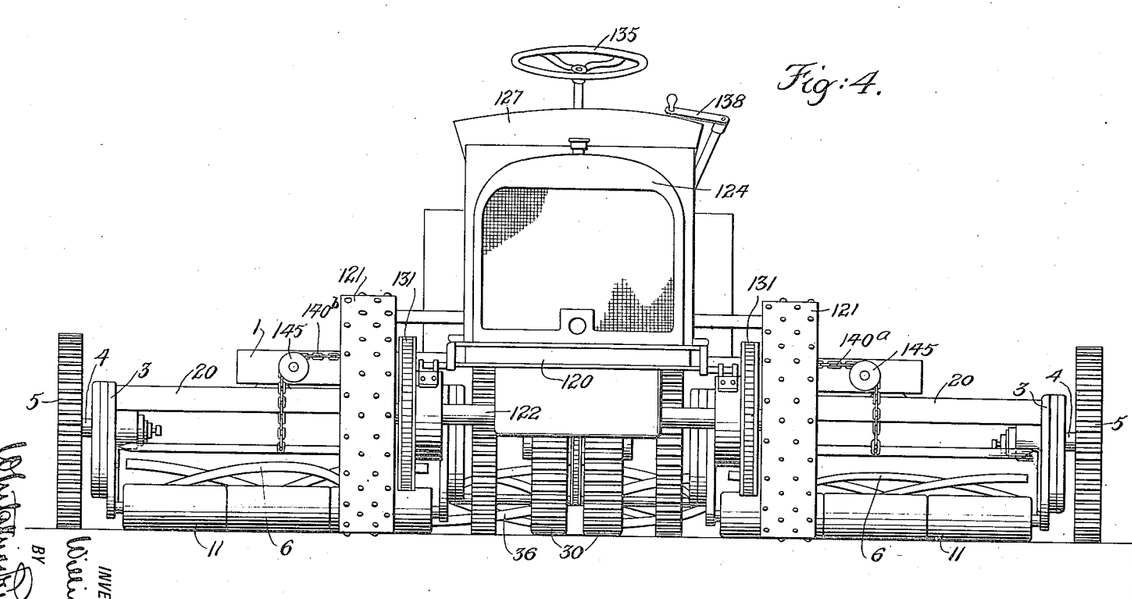
Fig. 4 represents a rear elevation thereof.
Figure 8:
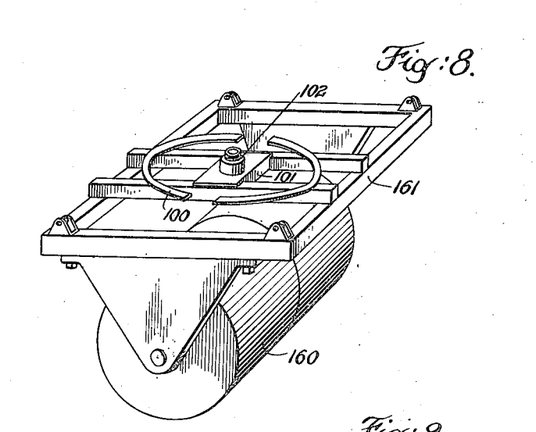
Fig. 8 is a view of a different propelled frame, provided with lawn rolling rollers, which may be employed in connection with the tractor frame.

I also prefer to provide for use in connection with the tractor, other forms of devices having rotary ground engaging members in conjunction with which the tractor may be conveniently used on a golf course, for example, or large estate, when it is not required to mow the lawn. Thus, in Fig. 8, I have shown a roller indicated at 160 mounted in a frame, 161, provided with a lower fifth wheel member, which is a duplicate of that carried by the frame, 1, of the gang mower member, hereinbefore described, and which is similarly lettered in Fig. 8. This roller may be of any desired width and weight, and obviously it may be substituted for the gang mower frame in Figs. 1, 2, 3 and 4, and connected with the steering chains, 136, so as to be propelled and steered in the same manner, as is the gang mower previously described.

Figure 9:
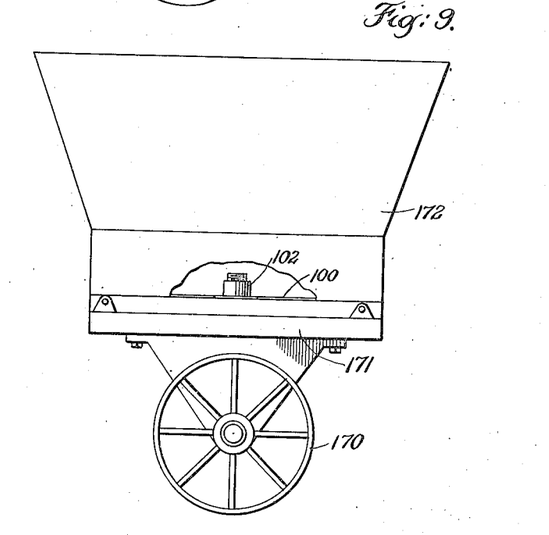
Fig. 9 is a view of another form of propelled frame provided with supporting wheels and a containing body which may be also used in connection with the tractor frame.

In Fig. 9, I have also shown a convenient form of truck for carrying grass, leaves, earth, etc., which is provided with supporting wheels, 170, and a frame, 171, provided with a lower fifth wheel member, identical with that previously described in connection with the gang mower frame, to receive the upper fifth wheel member carried by the longitudinal rod, 109, of the tractor member, the frame, 171, being provided with a body portion or receptacle, 172, of any convenient size or shape for the purposes indicated.

It will be obvious that in all these devices the connection between the tractor frame and the front member provides a transverse rocking motion on the longitudinal bar, 109, and that the engagement of said bar with the upper fifth wheel member when in operative relation with the lower fifth wheel member holds the roller frame (Fig. 8) or the carrier frame (Fig. 9) substantially balanced above and in proper relation with the axis of its rotary ground engaging device or devices.

By means of the apparatus herein shown and described grass on a golf course, or large estate, or the like, can be cut either by a draft animal or by the tractor, and the tractor can be used either in conjunction with the gang mower, the roller, or the carrier as may be most convenient for the operator.

I have stated that the tractor wheels are capable of adjustment longitudinally with respect to the tractor frame and have illustrated one form of means whereby this may be accomplished. It is to be understood in this connection that should a considerable change in the position of the wheels be made the driving chains will be lengthened or shortened by inserting or removing links to accommodate them to the adjusted position of the tractor wheels.

What I claim and desire to secure by Letters Patent is:

1. In a motor lawn mower, the combination with a plurality of mower units, comprising rotary traction devices and cutting mechanism driven therefrom, the cutting mechanism of said units being arranged to overlap each other, and the traction devices of all of said units being arranged in a single line extending transversely of the path traversed by the machine, a mower frame connecting said units and holding their traction devices substantially in said transverse line, of a tractor frame, rotary traction devices supporting a portion of the weight of said tractor frame, a motor carried by said tractor frame and operatively connected with said rotary traction devices, connections between said frames for uniting them and maintaining said mower frame in substantially horizontal position, said connections having means permitting said frames to rock transversely with respect to each other, and also having means for permitting the mower frame to oscillate on a vertical axis, and steering means on the tractor frame connected with the mower frame.

2. In a motor lawn mower, the combination with a plurality of mower units, comprising rotary traction devices and cutting mechanism driven therefrom, the cutting mechanism of said units being arranged to overlap each other, and the traction devices of all of said units being arranged in a single line extending transversely of the path traversed by the machine, a mower frame connecting said units and holding their traction devices substantially in said transverse line, of a tractor frame, rotary traction devices supporting a portion of the weight of said tractor frame, a motor carried by said tractor frame and operatively connected with said rotary traction devices, connections between said frames for uniting them and maintaining said mower frame in substantially horizontal position, said connections including a fifth wheel construction for permitting the oscillation of the mower frame with respect to the tractor frame on a vertical axis, and pivotal connections having a horizontal axis disposed substantially longitudinally with respect to the tractor frame and mower frame for permitting said frames to rock transversely independently of each other.

3. In a motor lawn mower, the combination with a plurality of mower units, comprising rotary traction devices and cutting mechanism driven therefrom, the cutting mechanism of said units being arranged to overlap each other, and the traction devices of all of said units being arranged in a single line extending transversely of the path traversed by the machine, a mower frame connecting said units and holding their traction devices substantially in said transverse line, of a tractor frame, rotary traction devices supporting a portion of the weight of said tractor frame, a motor carried by said tractor frame and operatively connected with said rotary traction devices, a fifth wheel structure one member thereof being connected to the mower frame, connections between the other member of the fifth wheel structure and the tractor frame having means for permitting the tractor frame to rock transversely with respect to its connected fifth wheel member, steering mechanism on said tractor frame, and connections therefrom to the mower frame.

4. In a motor lawn mower, the combination with a plurality of mower units, comprising rotary traction devices and cutting mechanism driven therefrom, the cutting mechanism of said units being arranged to overlap each other, and the traction devices of all of said units being arranged in a single line extending transversely of the path traversed by the machine, a mower frame connecting said units and holding their traction devices substantially in said transverse line of a tractor frame, rotary traction devices supporting a portion of the weight of said tractor frame, a motor carried by said tractor frame, and operatively connected with said rotary traction devices, a fifth wheel structure having upper and lower members connected by a pivotal connection having a vertical axis, the lower member being connected to said mower frame, and a part connected with said tractor frame and having pivotal connections with the upper member of the fifth wheel structure forward and in rear of the axis of the traction devices of said units, said last mentioned pivotal connections having a horizontally disposed axis extending longitudinally of the said frames.

5. In a motor lawn mower, the combination with a plurality of mower units, comprising rotary traction devices and cutting mechanism driven therefrom, the cutting mechanism of said units being arranged to overlap each other, and the traction devices of all of said units being arranged in a single line extending transversely of the path traversed by the machine, a mower frame connecting said units and holding their traction devices substantially in said transverse line, of a tractor frame, rotary traction devices supporting a portion of the weight of said tractor frame, a motor carried by said tractor frame and operatively connected with said rotary traction devices, a fifth wheel structure supported upon said mower frame, and comprising upper and lower members united by a pivotal connection having a vertical axis substantially in vertical alinement with the transverse line of the axis of the traction wheels of said units, said lower member being connected to the mower frame, a pivotal supporting bar connected to the tractor frame and having pivotal connections with said upper fifth wheel member forward of and in rear of the axis of said vertical pivotal connection.

6. In a motor lawn mower, the combination with a plurality of mower units, comprising rotary traction devices and cutting mechanism driven therefrom, the cutting mechanism of said units being arranged to overlap each other, and the traction devices of all of said units being arranged in a single line extending transversely of the path traversed by the machine, a mower frame connecting said units and holding their traction devices substantially in said transverse line, of a tractor frame, rotary traction devices supporting a portion of the weight of said tractor frame, a motor carried by said tractor frame and operatively connected with said rotary traction devices, a fifth wheel structure mounted on said mower frame, and including upper and lower members united by a pivotal connection having a vertical axis, said pivotal connection having a central aperture therethrough, a part connected with the tractor frame and connected to the upper fifth wheel member by pivotal connections having a horizontal axis adapted to substantially intersect the axis of said vertical connection, and means for simultaneously lifting and lowering the cutting mechanisms of all of said mower units into and out of operative relation with the ground, including a connection passing through the central aperture in said vertical pivotal connection of said fifth wheel structure.

7. In a motor lawn mower, the combination with a plurality of mower units, comprising rotary traction devices and cutting mechanism driven therefrom, the cutting mechanism of said units being arranged to overlap each other, and the traction devices of all of said units being arranged in a single line extending transversely of the path traversed by the machine, a mower frame connecting said units and holding their traction devices substantially in said transverse line, of a tractor frame, rotary traction devices supporting a portion of the weight of said tractor frame, a motor carried by said tractor frame and operatively connected with said rotary traction devices, a fifth wheel structure mounted on said mower frame and including upper and lower members united by a pivotal connection having a vertical axis, said pivotal connection having a central aperture therethrough, a part connected with the tractor frame and connected to the upper fifth wheel member by pivotal connections having a horizontal axis adapted to substantially intersect the axis of said vertical connection, and means for simultaneously lifting and lowering the cutting mechanisms of all of said mower units into and out of operative relation with the ground, including a connection passing through the central aperture in said vertical pivotal connection of said fifth wheel structure, and operating means on the tractor frame for said connection.

8. In a motor lawn mower, the combination with a plurality of mower units, comprising rotary traction devices and cutting mechanism driven therefrom, the cutting mechanism of said units being arranged to overlap each other, and the traction devices of all of said units being arranged in a single line extending transversely of the path traversed by the machine, a mower frame connecting said units and holding their traction devices substantially in said transverse line, of a tractor frame, rotary traction devices supporting a portion of the weight of said tractor frame, a motor carried by said tractor frame and operatively connected with said rotary traction devices, connections between the tractor frame and the mower frame for supporting the front end of the tractor frame, said connections having means for permitting said frames to rock transversely independently of each other and having means for permitting the mower frame to oscillate about a vertical axis with respect to the tractor frame, and means for permitting the adjusting of the tractor wheels of the tractor frame forwardly and rearwardly to vary the amount of weight carried by the traction wheels of the mower units.

9. In a motor lawn mower, the combination with a plurality of mower units, comprising rotary traction devices and cutting mechanism driven therefrom, the cutting mechanism of said units being arranged to overlap each other, and the traction devices of all of said units being arranged in a single line extending transversely of the path traversed by the machine, a mower frame connecting said units and holding their traction devices substantially in said transverse line, of a tractor frame, rotary traction devices supporting a portion of the weight of said tractor frame, a motor carried by said tractor frame and operatively connected with said rotary traction devices, readily separable connections between the mower frame and tractor frame, said connections having means permitting said frames to rock transversely with respect to each other, and having means for permitting the mower frame to oscillate upon a vertical axis with respect to the tractor frame, whereby the mower frame and tractor frame may be separated to permit the mower frame and connected units to be used independently and to permit the tractor frame to be used in connection with any frame supported by rotary ground engaging devices.

10. In a motor lawn mower, the combination with a plurality of mower units, comprising rotary traction devices and cutting mechanism driven therefrom, the cutting mechanism of said units being arranged to overlap each other, and the traction devices of all of said units being arranged in a single line extending transversely of the path traversed by the machine, a mower frame connecting said units and holding their traction devices substantially in said transverse line, of a tractor frame, rotary traction devices supporting a portion of the weight of said tractor frame, a motor carried by said tractor frame and operatively connected with said rotary traction devices, a fifth wheel structure supported on said mower frame, and comprising a lower member secured to said frame, and an upper member united to the lower member by a pivotal connection having a vertical axis, and readily detachable means for securing said members together, a forwardly extending part connected with the tractor frame and connected to said upper member by pivotal connections having their axes disposed horizontally, whereby said fifth wheel structure may be separated to enable the mower frame and tractor frame to be used separately.

11. In a motor lawn mower, the combination with a plurality of mower units each comprising rotary traction devices and cutting mechanism driven therefrom, the cutting mechanisms of said units being arranged to overlap each other, and the traction devices of all of said units being arranged in a single line extending transversely of the path traversed by the machine, a mower frame supported by two laterally arranged units, and connected thereto by means permitting said units to rock transversely with respect to each other, a centrally disposed mower unit being connected to said frame by means permitting it to rise and fall with respect to said frame, a tractor frame, tractor wheels therefor, a motor carried by said tractor frame and operatively connected with said wheels, said tractor frame having a forwardly extending part connected to the mower frame by pivotal connections having horizontal axes disposed longitudinally of the machine and a pivotal connection having a vertical axis to permit the mower frame to oscillate thereon with respect to the tractor frame, steering means on said tractor frame, and connections therefrom to the mower frame.

12. In a motor lawn mower, the combination with a mower frame, lawn mowing apparatus, comprising a plurality of cutting mechanisms and traction wheels for driving the same and connections between said lawn mowing apparatus and said mower frame for supporting the latter, said traction wheels having their ground engaging portions in a single transverse line extending across the machine, a tractor frame, tractor wheels therefor, a motor carried by said tractor frame and operatively connected with said wheels, said tractor frame having a portion connected to said mower frame by pivotal connections having a horizontal longitudinally disposed axis, and a pivotal connection having a vertical axis, steering mechanism on said tractor frame and connections between said steering mechanism and the mower frame.

13. In a motor lawn mower, the combination with a mower frame, lawn mowing apparatus having ground engaging traction wheels supporting said frame and having their ground engaging portions in a single line extending transversely of the machine, and being provided with cutting mechanism driven by said traction wheels, a tractor frame, tractor wheels for supporting the rear end of said tractor frame, an explosion engine carried by said tractor frame, a radiator for cooling said engine located at the rear end of the tractor frame, and having its air inlet apertures in its rear face, and connections between the forward end of the tractor frame and the mower frame, said connections having means for permitting said frames to rock transversely with respect to each other, and means for permitting the mower frame to oscillate upon a vertical axis with respect to the tractor frame.

14. In a motor lawn mower, the combination with a mower frame, lawn mowing apparatus having ground engaging traction wheels supporting said frame and having their ground engaging portions in a single line extending transversely of the machine, and being provided with cutting mechanism driven by said traction wheels, a tractor frame, tractor wheels for supporting the rear end of said tractor frame, an explosion engine carried by said tractor frame, a radiator for cooling said engine located at the rear end of the tractor frame and having its air inlet openings in its rear face, and connections between the forward end of the tractor frame and the mower frame, said connections having means for permitting said frames to rock transversely with respect to each other, and means for permitting the mower frame to oscillate upon a vertical axis with respect to the tractor frame, and a vertically and transversely disposed screen located in rear of the cutting mechanism for preventing cut grass from being carried to and drawn into the radiator.

15. In a motor lawn mower, the combination with a plurality of mower units each including rotary traction devices and cutting mechanism driven thereby, the cutting mechanisms of said units overlapping each other, a tractor frame, traction wheels therefor, a motor on said tractor frame operatively connected with the traction wheels thereof, connections between said tractor frame and said mower units, and lifting means on said tractor frame operatively connected with each of said units for simultaneously lifting the cutting mechanisms of all of said units out of operative relation with the ground.

16. In a motor lawn mower, the combination with a plurality of mower units each including rotary traction devices and cutting mechanism driven thereby, the cutting mechanisms of said units overlapping each other, a mower frame, connections between each unit and said frame permitting said unit to rock transversely with respect to the mower frame, a tractor frame, traction wheels therefor, a motor on said tractor frame operatively connected with the traction wheels thereof, connections between said tractor frame and mower frame, said connections having means for permitting the said frames to rock transversely with respect to each other, lifting mechanism on the tractor frame and connections from said lifting mechanism to each mower unit for lifting the cutting mechanisms of all of said units simultaneously.

17. In a motor lawn mower, the combination with a plurality of mower units each including rotary traction devices and cutting mechanism driven thereby, the cutting mechanisms of said units overlapping each other, a mower frame, connections between each unit and said frame permitting said unit to rock transversely with respect to the mower frame, a tractor frame, traction wheels therefor, a motor on said tractor frame operatively connected with the traction wheels thereof, connections between said tractor frame and mower frame, said connections having means for permitting the said frames to rock transversely with respect to each other, and having also means for permitting the mower frame to oscillate about a vertical axis with respect to the tractor frame, a steering device on the tractor frame, connections from said steering device to said mower frame, a lifting and lowering device on the tractor frame, and connections, operative in all positions of the mower frame with respect to the tractor frame, connecting the said lifting and lowering device to each of said units for simultaneously raising and lowering the cutting mechanism thereof.

18. In a motor lawn mower, the combination with a mower frame, lawn mowing apparatus comprising a plurality of cutting mechanisms, each including a rotary cutter and stationary knife, said cutting mechanisms being arranged to overlap each other, and traction wheels for driving said cutting mechanisms, said traction wheels being arranged in a single line extending transversely of the path of the machine, a tractor frame, tractor wheels therefor, a motor carried by said tractor frame, and operatively connected with said tractor wheels, and pivotal connections between said tractor frame and said mower frame having means for permitting the mower frame to swing with respect to the tractor frame on a vertical and a horizontal axis, and steering mechanism for turning the mower frame upon its vertical axis with respect to the tractor frame.

In testimony whereof I affix my signature.

WILLIAM H. COLDWELL.